Patented May 1, 1945

2,374,880

UNITED STATES PATENT OFFICE 2,374,880

METHINE DYESTUFFS

Willy Mueller, Basel, Switzerland, assignor to the firm Society of Chemical Industry in Basle, Basel, Switzerland No Drawing. Application March 25, 1943, Serial No. 480,569. In Switzerland April 11, 1942

4 Claims. (Cl. 260—457)

The present invention relates to dyestuffs which correspond to the general formula

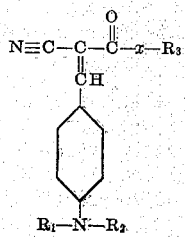

in which $R_1$ stands for a hydrogen atom or a lower alkyl group and $R_2$ stands for a lower alkyl group, in which further the atom grouping

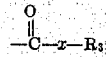

stands for an acidyl group wherein $x$ represents a

bridge ($R_4$=hydrogen or a lower alkyl) or an —O— bridge, and $R_3$ stands for a lower aliphatic radical consisting of at least two carbon atoms which contains at least one lyophile group consisting of an OH— group or a salt-forming group. In case the products contain salt-forming groups, these exist only in the

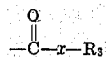

group. The new products are valuable dyestuffs which may be very suitable inter alia for the production of dyeings on cellulose esters or cellulose ethers or on artificial products of a different kind, for example shaped structures from so-called superpolyamides or superpolyurethanes.

The new dyestuffs may be used for dyeing artificial fibers from the just named products from suspensions or solutions. They may also be incorporated into these products previously to their conversion into shaped structures.

The expression lower alkyl as used in the above explained general formula is understood to include unsubstituted and also substituted alkyl, the expression "lower" indicating that the alkyl radicals do not contain more than six carbon atoms which are directly linked with one another. Substituents of the alkyl radicals are among others: OH— groups, halogen atoms, cyanogen groups, etherified or esterified OH— groups, esterified or amidated carboxyl groups, amidated sulfonic groups, sulfonic groups and the like, and, taking into consideration the restrictions made in the explanation to the general formula of the new dyestuffs, also water-solubilizing groups, such as carboxyl groups and sulfo-groups. As salt-forming groups which may be linked to the radical $R_3$, there can be used above all carboxyl groups, sulfonic acid groups and thiosulfonic acid groups, especially such carboxyl- or sulfonic acid groups which are linked to the radical $R_3$ in the form of acid esters.

The new dyestuffs are prepared according to the methods known for such products.

Generally, the process consists in condensing acyl compounds of the general formula

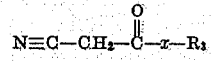

wherein $x$ has the above given significance, and $R_3$ stands for an aliphatic radical consisting of at least two and not more than six carbon atoms which are directly linked with one another and containing at least one OH— group or at least one substituent convertible into an OH— group or a substituent convertible into a salt-forming group, with aldehydes of the general formula

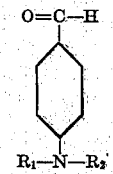

wherein $R_1$ and $R_2$ have the above indicated significance. If necessary, the conversion into an OH— group of a group convertible into such a group, and the conversion into a salt-forming group of the OH— group or of the substituent convertible into a salt-forming group is then effected. If the benzaldehyde derivative contains a substituent convertible into a salt-forming group, the conversion of the convertible substituent existing in the radical $R_3$ of the starting material should be effected prior to the condensation with the aldehyde, in view of the restrictions in the general formula of the new dyestuffs.

One form of carrying out the present method of working consists in starting from such derivatives of cyanoacetic acid which have been esterified with polyvalent alcohols in such a manner that only one OH— group is esterified. Such esters are condensed with aldehydes of the general formula

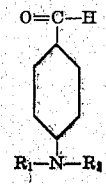

wherein $R_1$ and $R_2$ have the above given significance. If necessary, the OH— group and the OH— groups, respectively, are then esterified with polyvalent acids in such a manner that acid esters are formed. However, if the aldehyde contains an aliphatically bound OH— group, for example at the alkylamino group, the further esterification of the cyanoacetic acid ester will be effected prior to the condensation, as mentioned above.

A further form of carrying out the present method of working consists in starting from such derivatives of cyanoacetic acid which have been esterified with aliphatic alcohols which contain, besides the OH— group, one or several substituents convertible into an OH— group or a salt-forming group. The same procedure is followed as has been indicated in the preceding paragraph by effecting the conversion of the convertible substituent into an OH— group or a salt-forming group after the condensation has taken place. Here, too, it may be possible that the aldehyde contains also groups convertible into salt-forming groups. It is then advisable, for the reasons stated in the introduction, to effect the conversion of the cyanoacetic acid ester prior to the condensation with the aldehyde.

A further mode of operating the process consists in starting from amides of the cyanoacetic acid, which have been obtained with such primary or secondary alkylamines, the alkyl radicals of which consist of not more than six carbon atoms which are directly linked with one another, which contain, besides the amino group, at least one OH— group or at least one substituent convertible into an OH— group or a salt-forming group. These amides are condensed with the aldehydes of the already explained general formula and the conversion of the group convertible into an OH— group or a salt-forming group is then effected, if necessary. If the aldehyde contains a group which is capable of conversion into a salt-forming group, it is advisable also here to convert any substituents convertible into salt-forming groups into such groups prior to the condensation of the cyanoacetic acid amide.

The parent materials for the dyestuffs of the present process are on the one hand acidyl derivatives of the cyanoacetic acid and on the other hand N-alkyl derivatives of the para-aminobenzaldehyde. Among acidyl derivatives of the cyanoacetic acid are included their esters and amides. The products of the esterification are obtained for example from the cyanoacetic acid and the following polyvalent alcohols or halogen alcohols:—ethylenechlorohydrine, ethylenebromohydrine, glycol, epichlorohydrine, dihydroxypropanes, for example $\alpha$-$\gamma$-dihydroxypropane, butyleneglycols, for example $\beta$-butylene glycol, hexamethylene glycol, glycerine, dihydroxyacetone, glycerine-monoalkylethers, for example glycerine-monomethylether, glycerine-chlorohydrine; hexavalent alcohols, for example sorbite and the like, or alkylene-oxides, such as ethyleneoxide, epichlorohydrine etc. The amides are obtained by amidating the cyanoacetic acid with the following amines:—ethanolamine, diethanolamine, halogen-alkylamines, for example $\beta$-chloroethylamine and the like, or also by alkylating the cyanoacetic acid amide with alkyleneoxides, for instance ethylene-oxide, or dihalogenalkyl compounds, for example symmetrical dibromoethane. As N-alkyl derivatives of para-aminobenzaldehyde may be mentioned for example para - methylaminobenzaldehyde, para - ethylaminobenzaldehyde, para - methylethyl - aminobenzaldehyde, para - dimethylaminobenzaldehyde, para - diethylaminobenzaldehyde, para - dipropylaminobenzaldehyde, para - methylhydroxyethylaminobenzaldehyde, para - ethylhydroxyethylaminobenzaldehyde, para - dihydroxyethylaminobenzaldehyde, para - ethylmethoxyethylaminobenzaldehyde, para-methylmethoxyethylaminobenzaldehyde, para-butylhydroxyethylaminobenzaldehyde, para - ethyl - $\beta$ - chloroethylaminobenzaldehyde, para - methyl - $\beta$ - chloroethylaminobenzaldehyde, para - $\beta$ - dichloroethylaminobenzaldehyde and the like.

The aldehydes may be applied as such or in the form of their reactive derivatives, as are obtained for example in the reaction of aromatic N-dialkylamines with formaldehyde in the presence of sulfonic acids of aromatic nitro compounds and reducing agents.

The following examples illustrate the invention, but are not to be regarded as limiting it in any way, the parts being by weight:

*Example 1*

149 parts of para-dimethylaminobenzaldehyde are condensed for 12 hours at 90–100° C. with 129 parts of cyanoacetic acid-$\beta$-hydroxyethylester (obtained by condensation of molecular quantities of cyanoacetic potassium with ethylenechlorohydrine at 100° C.) and addition of 1 part of piperidine. The solution is dyed intensively yellow after a short time and the dyestuff begins to precipitate in yellow flakes after 1–2 hours. When cold, the whole mass has solidified to a solid cake. The whole is washed with 100 parts of alcohol, dried at 80–90° C., and there is obtained a light yellow powder which is slightly soluble in water.

The dyestuff of the formula

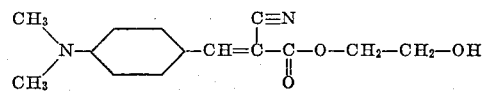

dyes acetate rayon from dilute aqueous solutions or suspensions greenish yellow tints of good fastness to light.

The condensation of para-dimethylaminobenzaldehyde with cyanoacetic acid-hydroxyethylester can just as well be carried out in an alcohol solution.

Similar products are obtained when using another alkylated aminobenzaldehyde instead of para-dimethylaminobenzaldehyde, for example para-methyl- or para-ethylaminobenzaldehyde, further para - methylethylaminobenzaldehyde, para - methylmethoxyethylaminobenzaldehyde, para - methyl - hydroxyethylaminobenzaldehyde, para - ethyl - hydroxyethylaminobenzaldehyde, para-ethyl-methoxyethylaminobenzaldehyde or also para - dihydroxyethylaminobenzaldehyde, further also para-ethyl-$\beta$-chloroethylaminobenzaldehyde or para-dichloroethylaminobenzaldehyde and the like. In those cases where such alkylaminobenzaldehydes are used which are substituted in the alkyd radical attached to the N-atom by hydroxyl groups, it is preferable not to use the aldehyde themselves for the above described condensation with cyanoacetic acid-$\beta$-hydroxyethylester, but their reaction products with aromatic amines or sulfonic acids of aromatic amines, for example metanilic acid, which are easily decomposable and easily obtainable.

Instead of the cyanoacetic acid-$\beta$-hydroxyethylester, there may also be used reaction products of alkylamines substituted by hydroxyl groups, that is to say hydroxyethylamides of cyanoacetic acid. Thus, cyanoacetic acid-β-hydroxyethylamide and also cyanoacetic acid-di-(β-hydroxyl)-amide can be used. With these derivatives of cyanoacetic acid the above named aldehydes can be converted into the methine dyestuffs in quite analogous manner.

Example 2

149 parts of para-dimethylaminobenzaldehyde are condensed for 12 hours at 95–100° C. with 159 parts of cyanoacetic acid-β-γ-dihydroxypropylester (obtained by condensation of molecular quantities of potassium cyanoacetate with glycerine-α-chlorohydrine at 100–110° C.) with addition of 1 part of piperidine. The dyestuff obtained of the formula

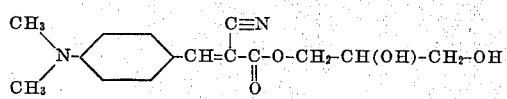

is slightly dissolved in hot water and dyes acetate rayon from aqueous solutions or suspensions pure yellow tints of good fastness to light.

Example 3

26 parts of the dyestuff obtained according to Example 1 are introduced at 100° C. into 15 parts of melted maleic acid anhydride. The dyestuff is dissolved immediately and the temperature is raised to 110° C. The whole is kept at this temperature for 1 hour and then allowed to cool. The melt is pulverized and neutralized with sodium carbonate at a low temperature in 500 cc. of water. The greatest part of the dyestuff is thus dissolved. The whole is filtered to remove the undissolved portion and the dyestuff is separated with sodium chloride. It is filtered, dried in a vacuum at 50° C. and there is obtained a yellow powder which dissolves in water to a yellow solution and dyes acetate rayon from an aqueous solution greenish yellow tints of good fastness to light. The new dyestuff corresponds to the formula

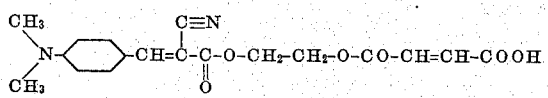

Instead of the maleic acid-anhydride used in this example there may also be used succinic acid-anhydride or phthalic acid-anhydride according to the same method of working and with similar results. Sulfo-carboxylic acids can also be applied, for example sulfobenzoic acid, sulfoacetic acid, chlorosulfoacetic acid.

Compounds which resemble amides can be treated in a similar manner, and, for example, cyanoacetic acid-β-hydroxyethylamides can be converted into an acid ester with a dibasic carboxylic acid. These reaction products can subsequently be converted into the dyestuffs with one of the already described aldehydes. This order of succession may also be chosen for products resembling esters, viz. esters of cyanoacetic acid. A dyestuff of this group corresponds for example to the formula

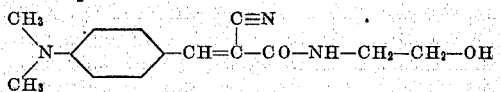

The method of working which consists in condensing the acid esters of the derivatives of cyanoacetic acid—either the acid esters from cyanoacetic acid-β-hydroxyethylester or the acid esters from cyanoacetic acid-β-hydroxyethylamide—with para-alkylaminobenzaldehydes, is applied preferably in those cases where para-alkylamino-benzaldehydes are used which are substituted in the alkyl radical by hydroxyl groups.

Products having similar properties can also be obtained by esterifying the cyanoacetic acid with alkylenehalogenhydrines, for example with ethylene chlorohydrine, whereupon the exchangeable halogen atom, either in these products or only after they have been converted into the methine dyestuffs with aldehydes of the indicated kind, can be converted into a solubilizing group, or into a salt-forming group, a SO₃H group or a S—SO₃H group. A dyestuff of the formula

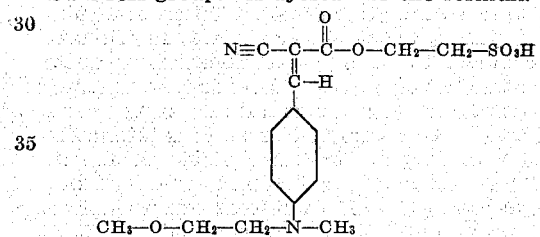

can be obtained for example in such a manner. Further dyestuffs obtainable on the basis of these data and those of the introduction are for example the products of the formulas

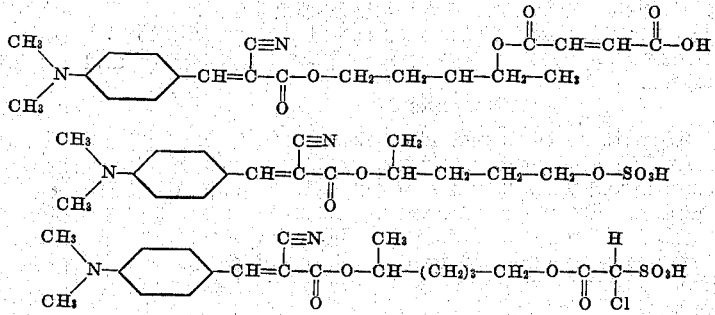

It is sometimes of advantage to effect the reaction with the dicarboxylic acid or the sulfocarboxylic acid, either with the finished dyestuff or with an intermediate product leading thereto, in an organic solvent, for example in benzene, chlorobenzene or toluene or solvent naphtha. It is then advantageous to proceed in such a manner that in those cases where water is formed in the esterification, this is distilled with part of the solvent as it is formed, that is to say during the reaction.

Example 4

50 parts of the dyestuff of the first paragraph of Example 1 are introduced at 0–5° C. into 100 parts of concentrated sulfuric acid and stirred during 3 hours at 20–30° C. The clear colorless solution is poured onto 500 parts of ice, stirred for 30 minutes at room temperature and the precipitated dyestuff is filtered off. The sulfuric acid ester is neutralized in 500 parts of water at a low temperature with sodium carbonate, the greater part going into solution. The whole is filtered to remove the undissolved portion, the sodium salt is precipitated with sodium chloride and the dyestuff is filtered and dried at 50° C. in a vacuum. There is obtained a yellow powder which dissolves in water to a yellow solution and dyes acetate rayon from an aqueous solution dark greenish tints having good fastness properties. The new dyestuff corresponds to the formula

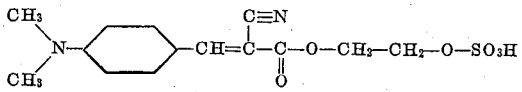

The esterification can be also effected in an organic solvent, for example in a halogenated hydrocarbon. It is then advantageous to use also chlorosulfonic acid. The esterification can be carried out with the finished dyestuff, as has been stated above, or also with an intermediate product, for example cyanoacetic acid-β-hydroxyethylester or cyanoacetic acid-β-hydroxyethylamide, whereupon the soluble methine dyestuffs can be produced by condensation with the aldehydes coming into question here.

*Example 5*

10 parts of the dyestuff of the first paragraph of Example 1 are ground with addition of a suitable dispersing agent, such as Turkey red oil, sulfite cellulose waste liquor, sulfonation products of the residues of the benzaldehyde manufacture, to a homogeneous paste containing 20 per cent. of dyestuff. One part of this paste is intimately mixed with 10 parts of water of 50° C. and so many parts of a concentrated soap solution, that the dye-bath prepared therefrom corresponds to a soap solution of 0.2 per cent. strength. It is then diluted with cold water to about 300 parts. 10 parts of acetate rayon yarn are introduced into the emulsion so prepared and handled therein, the bath is heated to 75° C. within ¾ hour and dyeing is continued at this temperature for ¼ hour. The material is then rinsed and brightened as usual, vivid green yellow tints being obtained.

*Example 6*

0.5 part of the dyestuff of Example 4 is dissolved in 3000 parts of water. The dye-bath is then mixed with 40 parts of crystallized sodium sulfate. 100 parts of acetate rayon yarn are treated in this bath during 1 hour at 80° C. After rinsing and drying there is obtained an acetate rayon which is dyed pure green yellow tints.

What I claim is:
1. The methine dyestuff of the formula

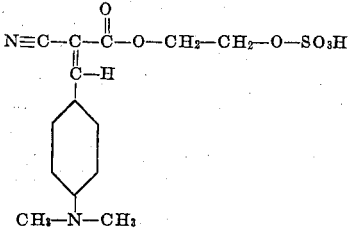

2. The methine dyestuff of the formula

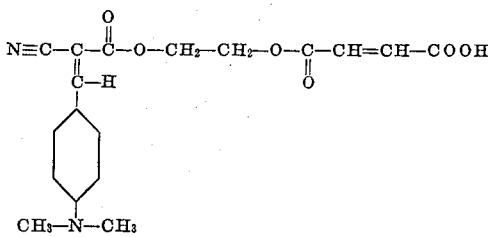

3. The methine dyestuff of the formula

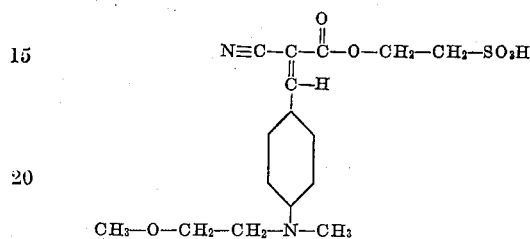

4. A member of the group consisting of the methine dyestuffs of the following formulae

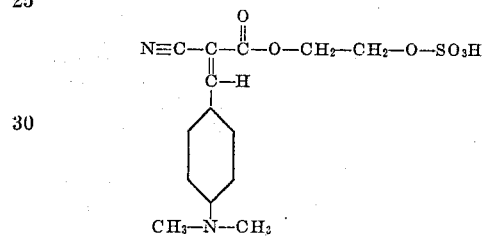

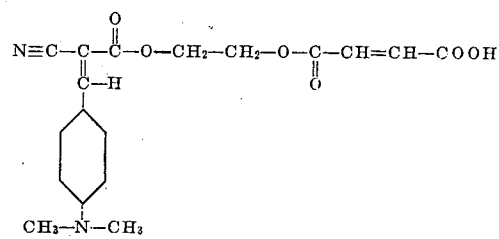

and

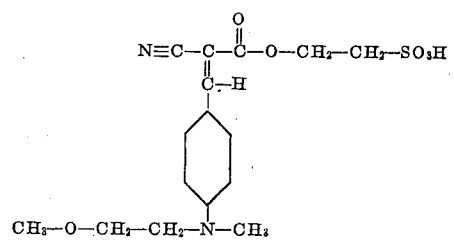

WILLY MUELLER.